United States Patent [19]

Mead et al.

[11] 3,969,143
[45] July 13, 1976

[54] ENCLOSURE FOR LITHIUM-IODINE CELL AND METHOD OF MAKING THE SAME

[75] Inventors: Ralph T. Mead, Kenmore; Norbert W. Frenz, North Tonawanda; Frank W. Rudolph, Depew, all of N.Y.

[73] Assignee: Wilson Greatbatch Ltd., Clarence, N.Y.

[22] Filed: July 22, 1975

[21] Appl. No.: 597,976

[52] U.S. Cl............................. 136/83 R; 136/134 P; 136/175
[51] Int. Cl.²........................................ H01M 4/36
[58] Field of Search ............ 136/83 R, 6 R, 100 R, 136/137, 166–170, 175, 134 P

[56] References Cited
UNITED STATES PATENTS

| | | | |
|---|---|---|---|
| 3,723,183 | 3/1973 | Greatbach | 136/83 R |
| 3,817,791 | 6/1974 | Greatbach et al. | 136/83 R |
| 3,874,929 | 4/1975 | Greatbach | 136/83 R |

*Primary Examiner*—John H. Mack
*Assistant Examiner*—C. F. Lefevour
*Attorney, Agent, or Firm*—Christel & Bean

[57] ABSTRACT

An enclosure for a lithium-iodine cell including a frame of a material which is non-reactive with iodine and containing a cell comprising a lithium anode, iodine-containing cathode material and a lithium iodine electrolyte, a pair of closure elements sealing opposite ends of the frame and folded onto the peripheral surface of the frame, and a band of iodine impermeable material overlying the abutting edges of the closure elements and embracing the frame. The enclosure is encapsulated in a polyester material for electrical insulation and sealing against iodine migration. The encapsulated enclosure is contained in an hermetically sealed outer casing of metal.

16 Claims, 7 Drawing Figures

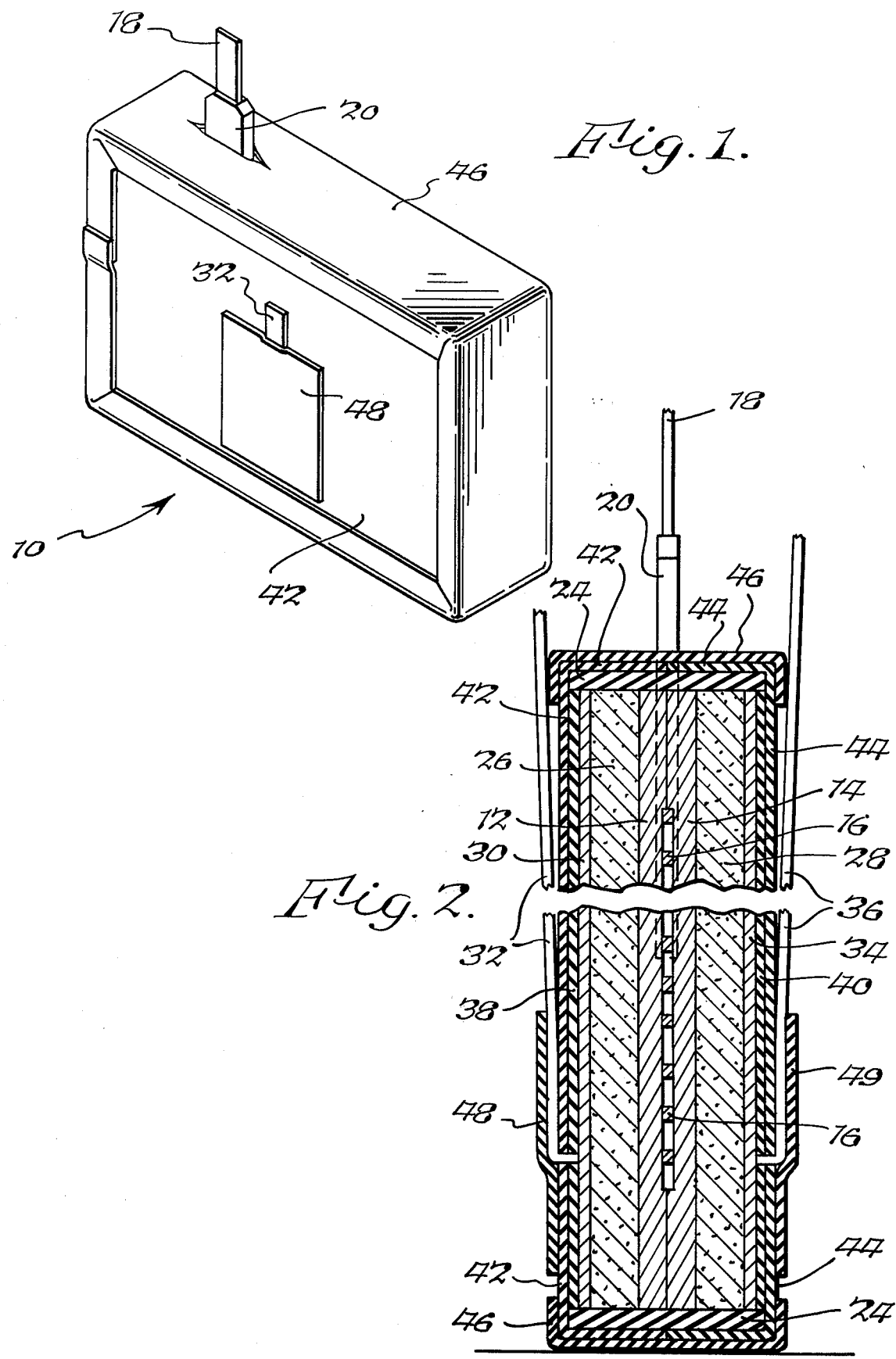

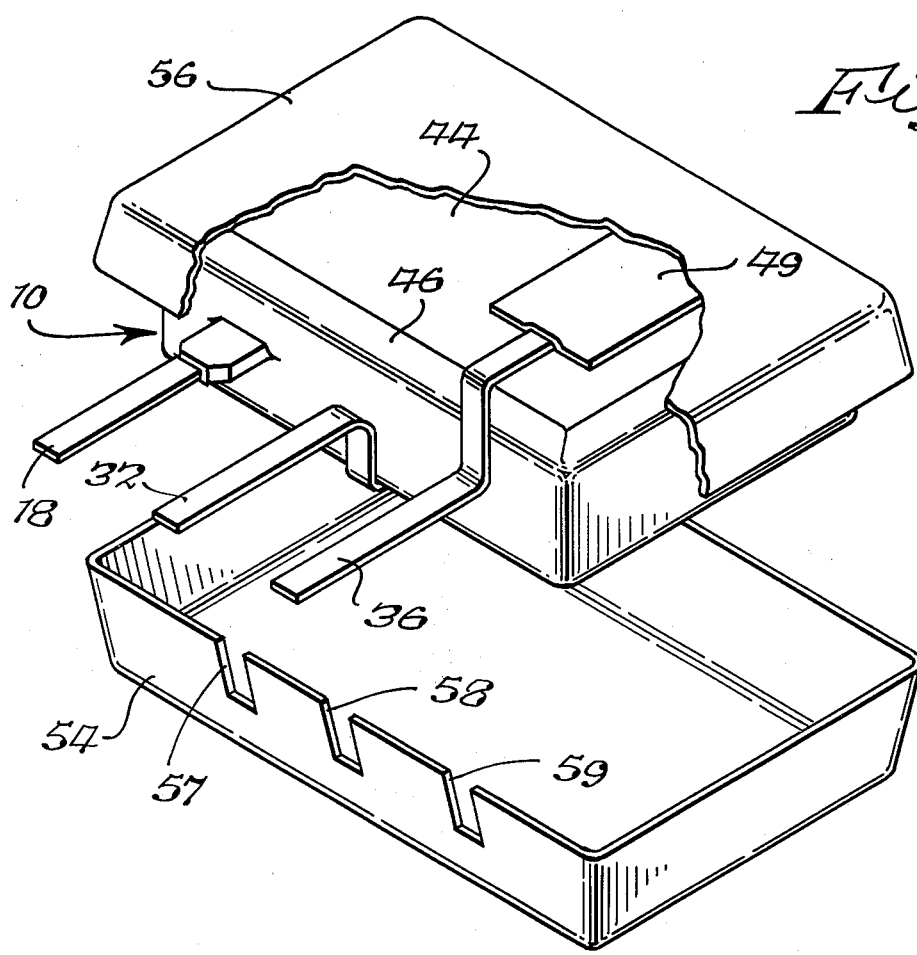
Fig. 3.
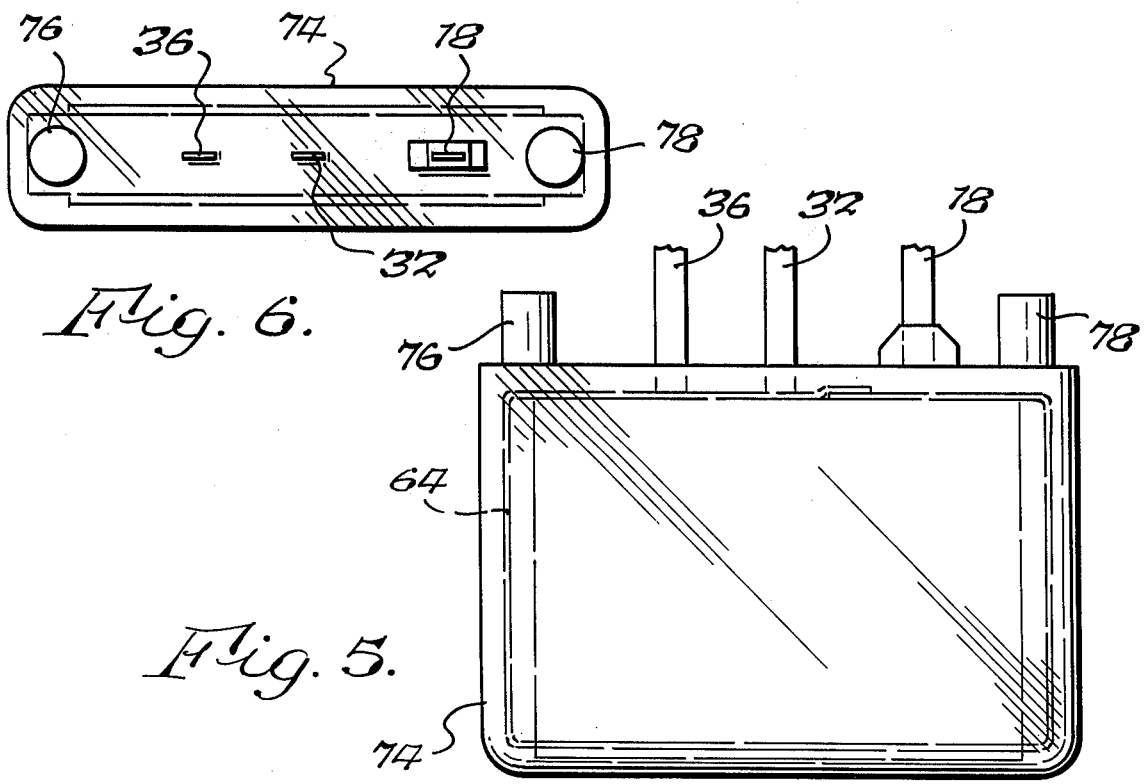
Fig. 6.
Fig. 5.

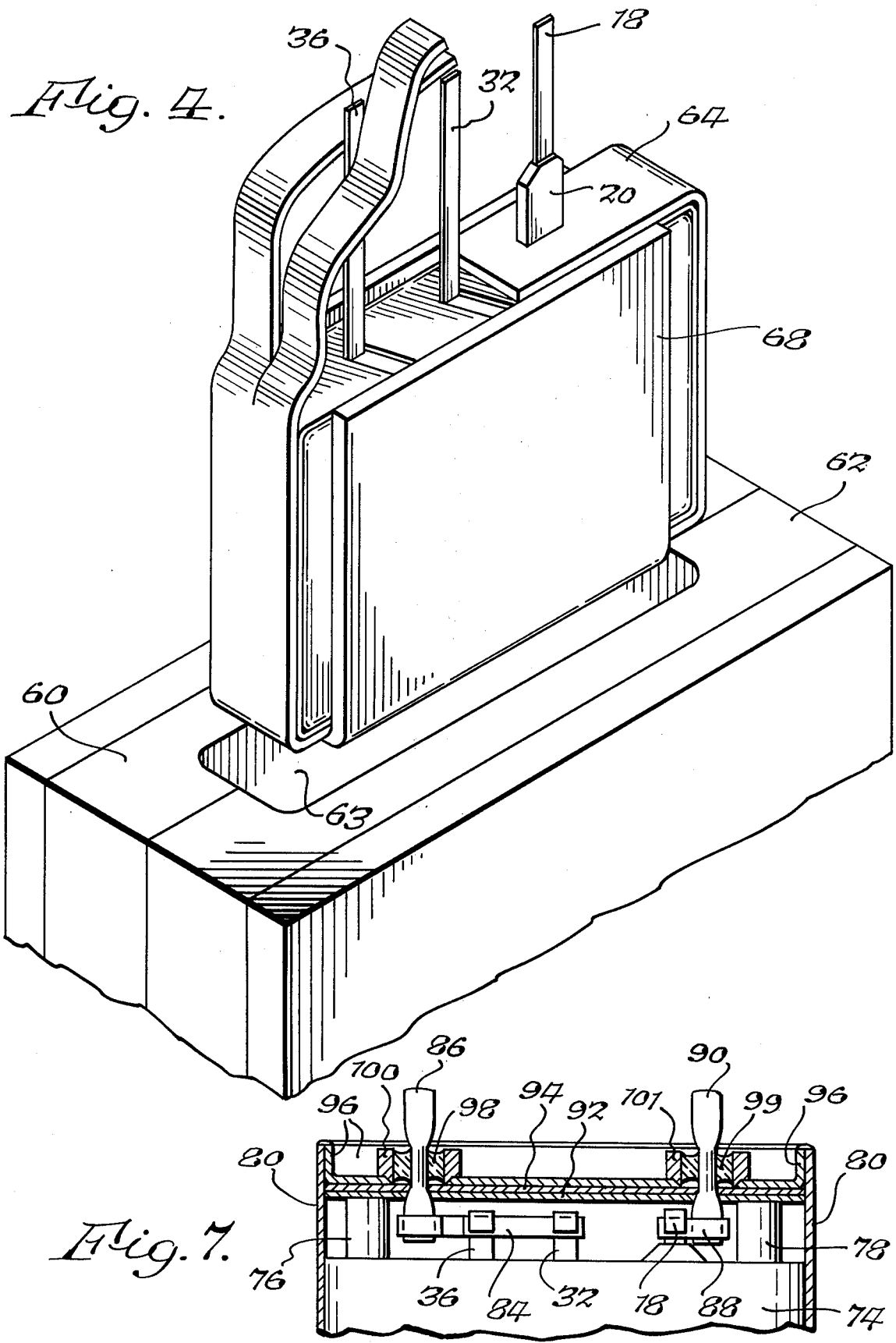

3,969,143

ENCLOSURE FOR LITHIUM-IODINE CELL AND METHOD OF MAKING THE SAME

BACKGROUND OF THE INVENTION

This invention relates to the conversion of chemical energy to electrical energy, and more particularly to a new and improved enclosure for lithium-iodine cells and a method of making the same.

One area of use of the present invention is in providing electrical power to inaccessible devices in the human environment, for example to an implanted cardiac pacemaker, although the principles of the present invention can be variously applied. Various batteries for implantable cardiac pacemakers have been proposed, but heretofore all have certain limitations. Lithium-iodine cells are available which advantageously have an open circuit voltage about twice that of the mercury cell, do not generate gas during operation, and have a non-corrosive electrolyte. A problem can arise, however, from the viscous nature of the iodine-containing material such as an iodine complex in that it tends to flow and may possibly form a short circuit path between the anode and cathode. It is important to prevent such leakage, not only to maintain cell operation but also to prevent harm to a human body in which the cell may be implanted.

SUMMARY OF THE INVENTION

It is, therefore, an object of this invention to provide a new and improved enclosure for a lithium-iodine cell and method of making the same.

It is a further object of this invention to provide such an enclosure which seals against any leakage of iodine-containing material from the cell as well as sealing against any gas released thereby.

It is a further object of this invention to provide such an enclosure which minimizes the chance of damage from any leakage of iodine-containing material which might occur.

It is a further object of this invention to provide such an enclosure which is relatively easy and economical to form and has a long wear life.

The present invention provides an enclosure for a lithium-iodine cell and method of making the same wherein a lithium-iodine cell comprising a lithium anode, iodine-containing cathode material and a lithium iodine electrolyte is placed in a frame of material which is non-reactive with iodine, first and second closure elements are placed against the frame at each end thereof and folded and sealed onto the peripheral surface of the frame, and a band of iodine impermeable material is applied over the peripheral surface of the frame and onto portions of the closure elements and sealed in place. The enclosure is encapsulated in a potting material which is non-reactive with iodine, and encapsulated enclosure is contained in an hermetically sealed casing of metal.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a perspective view of a lithium-iodine cell and enclosure according to the present invention;

FIG. 2 is a vertical section view of the cell and enclosure of FIG. 1;

FIG. 3 is a fragmentary developed view illustrating a portion of a further enclosure for the apparatus of FIGS. 1 and 2;

FIG. 4 is a perspective view illustrating a step in the method of enclosing a lithium iodine cell according to the present invention;

FIG. 5 is an elevational view of an encapsulated cell enclosure according to the present invention;

FIG. 6 is a top plan view of the encapsulated cell enclosure of FIG. 5; and

FIG. 7 is a fragmentary sectional view of a completed cell enclosure according to the present invention.

DETAILED DESCRIPTION OF THE ILLUSTRATED EMBODIMENT

A lithium-iodine cell according to the present invention is housed within an enclosure 10 which is generally rectangular in shape including a bottom portion as viewed in FIG. 1, spaced-apart side wall portions extending from the bottom, spaced apart end wall portions also extending from the bottom and joining corresponding ones of the side wall portions, and a top portion. The cell of the present invention as shown in detail in FIG. 2 comprises anode means positioned within the enclosure and comprising a pair of lithium elements 12, 14 which are pressure-bonded together and against an anode current collector element 16. An electrical conductor 18 is connected at one end to anode collector 16 and extends outwardly through the enclosure for making electrical connection thereto. An insulating cover 20 is provided on lead 18. The lithium elements 12, 14 with current collector 16 therebetween are fitted in a frame 24 of the enclosure of the present invention in a manner such that frame 24 continuously surrounds the peripheral edges of lithium elements 12, 14 and seals the edges. In preferred form, lithium plates 12, 14 are rectangular in shape and accordingly frame 24 is of rectangular configuration. Other shapes can of course be employed. Frame 24 is of a material which is nonreactive with iodine, and by virtue of the configuration thereof frame 24 is open at opposite end faces thereof. Frame 24 is of a fluoropolymer material which does not exhibit electronic conduction when exposed to iodine. Examples of such materials are those marketed under the registered trademarks Durasan and Halar of the Allied Chemical Company. Frame 24 has a cross sectional shape conforming to the peripheral shape of the lithium elements in a manner exposing oppositely-directed lithium surfaces. The width of frame 24, i.e. the horizontal dimension measured in the plane of the paper as viewed in FIG. 2, is relatively greater than the combined width or thickness of lithium elements 12, 14 which are located generally centrally of the width of frame 24.

The lithium-iodine cell of the present invention further comprises iodine-containing cathode material contained within frame 24. The iodine-containing cathode material comprises two regions 26, 28 within frame 24 on opposite sides of the lithium anode. In particular, region 26 contacts the exposed surface portion of lithium element 12 and occupies region within frame 24 from lithium plate 12 almost to the outer edge surface of frame 24 at the left as viewed in FIG. 2. Similarly, region 28 contacts the exposed surface of the lithium element 14 and occupies the region within frame 24 from lithium element 14 almost to the opposite outer edge of frame 24. In preferred form, the iodine containing cathode material comprises a charge transfer complex of an organic component and iodine, for example polyvinyl pyridine iodide as will be described in further detail presently. The cell according to the present invention further comprises cathode conductor means operatively associated with each of the regions of cathode material. In particular, a cathode current collector element 30 is positioned in contact with the exposed surface of cathode material 26 and is located within the corresponding outer edge surface of frame 24. An electrical conductor 32 connected at one end to current collector 30 extends through the enclosure so as to be available for external electrical connection. Similarly, a cathode current collector 34 is positioned in contact with the exposed surface of cathode material 28 and is positioned slightly inwardly of the corresponding outer edge surface of frame 24. An electrical conductor 36 is connected at one end to collector 34 and extends through the enclosure so as to be externally available for making an electrical connection thereto. There is also provided a spacer element 38 adjacent the exposed surface of collector 30 and a similar spacer element 40 adjacent collector 34. Both spacer elements 38, 40 are in sheet form and preferably the outer surfaces thereof are generally flush or coplanar with the corresponding outer surfaces of frame 24. Spacers 38, 40 serve to maintain the corresponding cathode current collectors in operative contact with the cathode material in a manner which will be described.

The enclosure for the lithium iodine cell of the present invention further comprises first and second closure elements 42, 44, respectively, on opposite ends of frame 24, the closure elements sealing the open ends of frame 24 and peripheral portions of closure elements 42, 44 are folded onto the peripheral surface of frame 24 with the terminal edges of elements 42, 44 being in substantially abutting relation. Closure elements 42, 44 each are of sheet form, are of material which is nonreactive with iodine, and are secured in place on frame 24 by a suitable cement in a manner which will be described in detail presently. The enclosure of the present invention further comprises a band 46 of iodine resistant material overlying the edges of the closure element 42, 44 and embracing frame 24. Band 46 is of a material allowing very little or no iodine transmission therethrough while at the same time having sufficient flexibility enabling it to be applied to the assembly in the manner described and as shown in FIG. 2. A preferred material for band 46 is polytetrafluoroethylene (Teflon). Band 46 is in the form of an elongated strip or sheet applied to the assembly and secured in place by a suitable cement in a manner which will be described in further detail presently.

The lithium iodine cell and enclosure according to the present invention illustrated in FIGS. 1 and 2 is formed by the following method. The anode conductor means comprising lead 18 having a portion embedded in insulator 20 is formed by stamping or otherwise forming the lead 18 to have slots or apertures spaced along a portion of the length thereof to facilitate adherence of the material 20. According to a preferred method, a strip of Halar material is placed in a mold, lead 18 is placed on top thereof, another strip of Halar material is placed on top of the lead 18 and then sufficient pressure and heat are applied to form the completed structure with lead 18 embedded or encapsulated in the Halar insulating material 20. The region adjacent one end of conductor 18 is left exposed and is bonded or welded to anode current collector 16 in a suitable manner. By way of example, the anode lead 18 is of annealed zirconium having a thickness of about 0.005 inch, and anode collector or screen 16 is of annealed zirconium expanded No. 12 mesh having a thickness of 0.004 inch. Next, the anode lithium plates 12, 14 with current collector 16 therebetween and lead 18 extending therefrom are fitted in the frame 24. In particular, the frame 24 is of a material which does not exhibit electronic conduction when exposed to iodine such as the aforementioned Halar material, and by way of example frame 24 has a thickness of about 0.030 inch, a width of about 0.380 inch and configuration or perimeter dimensions of about 1.165 inches by about 1.79 inches. Frame 24 is provided with an opening or aperture of a size permitting lead 18 and the insulator 20 to be fitted therethrough as in FIG. 2. The sandwiched arrangement of lithium plates 12, 14 and collector 16 is fitted in frame 24 generally centrally along the width thereof and in a plane generally parallel to the plane of the opposite edges surrounding the open ends thereof. Then the combination of the anode assembly and frame 24 is placed in a suitable fixture or holding means and then a suitable force, example about 3,000 lbs., is applied to the lithium plates, causing the assembly to be bonded together. As a result, the lithium plates 12, 14 are bonded together in a manner sealing current collector 16 between the plates and the peripheral juncture or edges of plates 12, 14 is sealed by the frame 24. In this connection, the material of frame 24, in addition to not exhibiting electronic conduction when exposed to iodine, also should have the characteristic of being pressure bondable to lithium.

The cathode material of regions 26, 28 comprises a charge transfer complex of an organic material and iodine. The organic material should be an electron donor and can be any organic compound having a double bond or an amine group. An electron donor gives the iodine sufficient conductivity for proper cell operation. A preferred organic material is two-vinyl pyridine polymer. The cathode material is prepared by heating the organic material, i.e. two-vinyl pyridine, mixed with iodine, to a temperature greater than the crystallization temperature of iodine. The amount of iodine should be greater than about 50 percent by weight of the resulting mixture so that enough iodine is available in the cathode material to provide sufficient conductivity for proper cell operation.

The resulting mixture is a viscous, flowable substance which is combined with the anode to form the cell in the following manner. The subassembly comprising frame 24 with the anode fixed therein is placed on a supporting surface in a position such that the anode plates 12, 14 are disposed in a generally horizontal plane, and so that one of the exposed lithium surfaces is facing upwardly. The cathode material is poured therein up to a level slightly below the upper edge surface of frame 24, thereby providing one region of cathode material, for example region 26. Then the assembly of collector 30, spacer 38 and closure element 42 is moved into place. In particular, spacer 38 and closure 42 are provided with aligned apertures or openings to receive the cathode lead 32. Collector 30 and spacer 38 fit within frame 24 so that the outer surface of the spacer 38 is generally flush with the plane of the edge surface of frame 24. The outer or peripheral portion of closure sheet 42 is folded or otherwise formed around the perimeter of frame 24 and sealed in place. This can be done with a suitable epoxy material which is non-reactive with iodine, the epoxy material being applied between closure element 42 and frame 24 and then cured to hold the elements in place. Thus closure element 42 covers the entire end of frame 24 and extends along the width thereof to the center where it will meet the other closure element 44 in a manner to be described. The region of closure element 42 through which lead 32 extends can be provided with a lead seal patch 48 which preferably is of Teflon material and is sealed in place by the aforementioned cyanoacrylate cement. Next, the assembly is inverted and the foregoing procedure repeated for the other portion of the cell. In particular, the assembly will be supported so that the lithium plates 12, 14 are disposed generally horizontally with the surface of plate 14 facing upwardly and the cathode material is poured therein to provide region 28 at a level slightly below that of the upwardly facing edge portion of frame 24. The assembly of collector 34, spacer 40 and closure element 44 are positioned and assembled in place in a manner identical to that previously described for the other half of the cell. A lead seal patch 49 is cemented in place around the opening in enclosure 44 in a manner similar to that of patch 48.

By way of example, cathode collectors 30, 34 each are of annealed zirconium having a thickness about 0.001 inch and rectangular dimensions of about 1.0 inch by 1.6 inches, spacers 38, 40 each are of Teflon material having a thickness of 0.003 inch and rectangular dimensions of about 1.0 inch by about 1.6 inches, and closure element 42, 44 each are of Teflon material having a thickness of about 0.005 inch and rectangular dimensions of about 1.5 inches by about 2.2 inches. Cathode leads 32, 36 each are of annealed zirconium having a thickness of about 0.005 inch.

Band 46 is elongated having a length slightly greater than the perimeter measured around the outer surface of frame 24. It is applied so as to extend around the frame covering the entire width thereof and is folded along the opposite edges thereof so as to form an overlying border around each of the corresponding ends of frame 24 as shown in FIGS. 1 and 2. Thus band 46 covers the seam or abutting edges of closure elements 42, 44 around the perimeter of frame 24, and has a width slightly greater than that of frame 24 so as to extend around the opposite edges and along the opposite end faces thereof for a short distance. The two ends of band 46 are brought together in a slightly overlapping relation as shown in FIG. 1. Band 46 is held in place by a suitable cement, for example the aforementioned cyanoacylate cement, which is relatively fast setting and non-reactive with iodine. While Teflon is preferred material for band 46, other materials which transmit no iodine or negligible amounts thereof and which have sufficient flexibility so as to be formed according to the foregoing procedure can of course be employed.

The lithium iodine cell of the present invention operates in the following manner. As soon as the iodine-containing cathode material of regions 26 and 28 contact the exposed surface portions of lithium 12 and 14, respectively, a lithium-iodine electrolyte begins to form at each interface between material 26 and element 12 and material 28 and element 14, and electrical potential differences exist between anode lead 18 and cathode leads 32, 36. It is important that the iodine-containing cathode material of regions 26, 28 is not allowed to come in contact directly with any portion of the anode electrical conductor including current collector 16 and lead 18. Otherwise, this will cause a condition of electronic conduction between the cathode material 26, 28 and the anode conductor creating an electrical short circuit condition in the cell. In particular, any migration of the iodine-containing complex of material 26, 28 directly to anode current collector 16 or directly to lead 18, without first reacting with lithium elements 12, 14 of the anode, will result in the condition of electronic conduction thereby creating an electrical short circuit in the cell. On the other hand, when the iodine-containing material 26, 28 contacts only the corresponding lithium element 12, 14 this gives rise to first a condition of ionic conduction and results in proper cell operation.

The cell construction according to the present invention advantageously prevents an electrical short circuit caused by migration or flow of material 26, 28. In particular, the arrangement wherein anode current collector 16 is pressed between lithium elements 12, 14 enhances the protective seal provided by frame 24 for current collector 16 against iodine migration. Thus, the anode collector 16 is effectively isolated from the iodine-containing complex of cathode material 26, 28. In addition, the junction between the inner surface of frame 24 and the periphery of elements 12, 14 can be sealed further by a suitable cement which is non-reactive with iodine such as the previously mentioned cyanoacrylate cement. The opening in frame 24 through which lead 18 and the surrounding insulator 20 extend is sealed with such cement. This together with the fact that the material of insulator 20 is non-reactive with iodine contributes to the foregoing sealing and isolation.

Spacer elements 38 and 40 act as springs to maintain the corresponding cathode current collectors 30 and 34, respectively, in contact with the regions of cathode material 26, 28 during the life of the cell. If for any reason either region of cathode material should contract or experience any other physical distortions tending to separate it from its cathode current collector, the corresponding spacer element 38, 40 compensates for this by urging the current collector element back into contact with the cathode material. In addition, each cathode current collector has more chemical attraction or affinity for the corresponding region of cathode material than for the Teflon material of the corresponding spacer element, and if there is any shrinkage in the cathode material during cell discharge, this shrinkage will be accomodated by separation from the material of spacers 38, 40 rather than from current collectors 30, 34.

The provision of closure elements 42, 44 sealing the ends of frame 24 and extending around the periphery thereof seals against any leakage of cathode material 26, 28 from within the assembly contained in frame 24. Wrapping closure elements 42, 44 around so that the abutting edges are located midway or centrally of the outer surface of frame 24 maximizes the length of any potential leakage, path out from regions 26, 28 and inwardly along the peripheral surface of frame 24 under closure elements 42, 44. Should any leakage occur, either along this path or along the opening in frame 24 containing lead 18 and insulator 20, such leakage is prevented or at least minimized by the band 46 covering the perimeter of the assembly and over the entire width of the assembly and also extends along portions of the corresponding end of surfaces thereof. In other words, should any leakage occur, it would still have to travel from the region centrally of frame 24 along a distance equal to one-half the width thereof and then along a portion of the end surface of either closure element 42, 44. The foregoing is enhanced by having the material of band 46 and closure elements 42, 44 and the cement and epoxy material sealing the various components in place all of materials which exhibit a negigible amount or no transmission of iodine.

The cell of the present invention is encapsulated in potting material in the following manner. There is provided a hollow casing including two complementary parts 54, 56 shown in FIG. 3. The two parts are generally rectangular and cup-shaped and are formed of a material which is non-reactive with iodine, for example the aforementioned Halar material. The cups 54, 56 by way of example can be formed each to have a thickness of 0.010 inch, and the dimensions thereof are determined by the size of the cell assembly they are to enclose. One of the cup-shaped casing elements, for example cup 54 shown in FIG. 3, is provided with slots or openings 57, 58 and 59 along one rim thereof to receive the leads 18, 32 and 36 respectively and this cup provided with slots 57, 59 also is of greater depth than the complementary cup element. When the two elements 54, 56 are brought together, the leads of the cell assembly will extend outwardly through the slots in cup 54, the peripheral edge of the rim of cup 56 will rest or abut against the leads, and the surface of the base portion of cup element 56 will be generally flush or coplanar with the peripheral edge surface of the rim of cup element 54.

According to the method of the present invention, liquid potting material is introduced to at least one of the parts 54, 56, the parts are brought together and about the enclosed cell or sub-assembly 10, and the resulting assembly is placed along with additional potting material into a mold. In particular, a preferred manner of carrying out this aspect of the method of the present invention includes placing the two cups 54, 56 on a work surface such as a table in an upwardly facing position and then pouring the potting material into each cup element 54, 56 to a level at about midway of the height or depth thereof. The potting material should be of a type which is non-reactive with iodine, and a preferred potting material is a polyester material commercially available from the Durez Division of the Hooker Chemical Company under the designation Hetron 32A. Then the enclosed cell 10 of FIGS. 1 and 2 is placed in one of the parts, preferably cup 54 having the slots therein so that the leads 18, 32, 36 are fitted in and extend outwardly from the slots 57, 58, 59, whereupon the other casing part 56 is grasped and placed onto the sub-assembly over the enclosed cell 10 and fitting into cup 54. Then the assembly is placed in a mold in the following manner. As shown in FIG. 4, a preferred mold consists of two halves 60, 62 which cooperatively define a cavity 63 to receive the assembly. Potting material is introduced beforehand to the mold cavity in an amount sufficient such that when the assembly is placed in the mold potting material will be forced or otherwise moved upwardly along all surfaces of the assembly and over the top thereof. Prior to the entering mold cavity 63, the assembly is provided with a band or strip 64 as shown in FIG. 4 which is wrapped around the periphery thereof prior to the insertion in the mold. Strip 64 preferably is of fiberglass material having an opening adjacent one end thereof to fit over or onto the anode lead assembly comprising insulator 20 and lead 18, and band 64 is slotted at the opposite end thereof to facilitate wrapping it or placing it alongside the two leads 32, 36 as shown in FIG. 4. With band 64 in place, a sheet or wrapping element 68 is fitted around the bottom and two major sides of the assembly. Sheet 68 preferably also is of fiberglass material and is dimensioned to cover the bottom and two major sides of the assembly as shown in FIG. 4. The arrangement is placed into the mold cavity 63 in a downward direction as illustrated in FIG. 4. This is done initially by hand and then the assembly is moved further down by a suitable machine. Preferably there would be provided two rectangular members or seating blocks (not shown) for contacting the upper part of the assembly and having recesses or being otherwise formed to accomodate the leads and contacting the upper surface of the assembly as it is pressed down into the mold by a machine. Then the mold containing the encapsulated assembly is heated at a temperature and for a duration adequate to cure the polyester material.

After the potting material has been caused to solidify, the mold is removed thereby providing an encapuslated casing 74 as shown in FIGS. 5 and 6. The upwardly extending elements or protuberances 76, 78 are entirely of potting material, being integral with casing 74 and formed as a result of corresponding openings provided in the aforementioned seating blocks, and serve to support a lid header assembly in a manner which will be described presently. The exterior surface of the encapsulated enclosure 74 is made sufficiently smooth, such as by scraping, polishing or similar operations, to permit visual inspection of the components encapsulated therein.

The cell enclosure of the present invention is completed by a hollow casing 80 shown in FIG. 7 which encloses the encapsulated casing 74. Casing 80 preferably is hollow and rectangular in shape, being of a size sufficient to contain the encapsulated casing 74, and is of metal such as stainless steel. Casing 80 is drawn or otherwise formed to be of integral construction including a bottom, spaced-apart side walls extending from the bottom, and spaced-apart end walls also extending from the bottom and joining corresponding ones of the side walls. Thus casing 80 has a shape similar to that of the potted enclosure 74.

Enclosure 74 is placed in casing 80 with leads 18, 32, and 36 adjacent the open top of casing 80. Leads 32 and 36 are bent around and welded to an intermediate lead element 84 which, in turn, is bent around at one end and welded to a terminal member 86. Similarily, lead 18 is bent around and welded to one end of another intermediate lead element 88 which, in turn, is bent around and welded to a second terminal member 90. Terminals 86, 90 preferably are of stainless steel. An electrical insulating member or strip 92 of Teflon or similar material is supported at each end on the surfaces of the raised portions or protuberances 76, 78. A thermal insulating member or strip 94 of fiberglass or similar material is supported on strip 92 and terminals 86, 90 extend through apertures provided in the strip members 92, 94. The enclosure is sealed by a lid header member 96 which sits in the opening of casing 80 and is welded therein to form a hermetically sealed enclosure. The hermetic seal confines any gas generated by the cell within the enclosure and it keeps any external moisture from entering the cell. Bushings 98 and 99 are sealed in ferrules 100 and 101, respectively, suitably secured to header 96 over openings formed therein, and the other ends of terminals 86, 90 project beyond header 96 for making electrical connections to the cell. By virtue of this arrangement, header member 96 and insulator strips 92, 94 are supported on protuberances 76, 78 so as to be spaced from the neighboring end of potted enclosure 74. The region or space therebetween not only provides room for leads 18, 32 and 36 and connection thereof to terminals 86, 90 but also provides a space to accomodate any leakage of the iodine-containing cathode material, should that occur, thereby preventing any leaking material from contacting header element 96. The strip of fiberglass material 94 provides thermal insulation for the electrical insulator strip 92 from heat developed by and around the header 96.

In the enclosure of the present invention, leakage of the iodine-containing cathode material from the enclosure or casing 10 is prevented by a number of factors such as the anode and frame combination, closure elements 42, 44 and band 46 as explained in detail previously. Should any leakage of the viscous iodine-containing material from enclosure 10 occur, however, the chance of any damage resulting therefrom is greatly reduced by the containment of enclosure 10 in casing parts 54, 56 and encapsulation in the polyester potting material to provide potted enclosure 74. The polyester material provides electrical insulation and long term sealing against iodine leakage. The casing 80 confines any gas which may be expelled from the sub-assembly 10, and this is augmented by the hermetic seal between casing 80 and lid 96. As a result, the enclosure of the present invention affords a long lifetime for the lithium-iodine cell and renders it safely implantable and usable in the human body.

It is therefore apparent that the present invention accomplishes its intended objects. While a single embodiment of the present invention has been described in detail, this is for the purpose of illustration, not limitation.

We claim:

1. An enclosure for a lithium-iodine cell comprising:
   a. a frame of a material which is non-reactive with iodine and being open at opposite ends thereof, said frame containing a lithium-iodine cell comprising a lithium anode, iodine-containing cathode material and a lithium-iodine electrolyte said frame having a cross sectional shape conforming with the peripheral shape of said lithium anode;
   b. first and second closure elements on said opposite ends of said frame, said closure elements sealing the open ends of said frame and peripheral portions of said elements being folded onto the peripheral surface of said frame with the terminal edges of said elements being in substantially abutting relation; and
   c. a band of iodine impermeable material overlying the edges of said closure elements and embracing said frame.

2. Apparatus according to claim 1, wherein said band is of polytetrafluoroethylene material.

3. Apparatus according to claim 1, further including potting material encapsulating said enclosure, said potting material being non-reactive with iodine.

4. Apparatus according to claim 3, wherein said potting material comprises polyester material, said encapsulated enclosure having an exterior surface sufficiently smooth to permit visual inspection of the encapsulated enclosure.

5. Apparatus according to claim 3, further including an hermetically sealed casing containing said encapsulated enclosure.

6. Apparatus according to claim 5, wherein said casing is of metal.

7. Apparatus according to claim 1, wherein said cell comprises:
   a. an anode current collector;
   b. a pair of lithium elements bonded together and against said current collector in a manner sealing said collector between said elements, said lithium elements being fitted in said frame in a manner such that said frame continuously surrounds the peripheral edges of said lithium elements and seals said edges;
   c. electrical conductor means connected to said anode current collector and extending through said frame member and said band;
   d. said frame having a cross sectional shape conforming with the peripheral shape of said lithium elements in a manner exposing two oppositely directed lithium surfaces and said iodine-containing cathode material comprising two regions each containing a corresponding one of said exposed lithium surfaces; and
   e. cathode conductor means operatively associated with each of said regions of cathode material, each cathode conductor comprising a current collector element operatively contacting the corresponding region of cathode material at a location spaced from said anode and electrical conductor means connected to said current collector and extending through said enclosure.

8. Apparatus according to claim 7, wherein each of said current collector elements is positioned between the corresponding region of cathode material and the corresponding one of said closure elements, and wherein said apparatus further comprises spacing means between each cathode current collector element and the corresponding closure element for maintaining said collectors in operative contact with said cathode material.

9. Apparatus according to claim 7, wherein said cathode material comprises a charge transfer complex of an organic donor component and iodine.

10. Apparatus according to claim 9, wherein said organic donor component comprises polyvinyl pyridine.

11. A method of enclosing a lithium-iodine cell comprising the steps of:
   a. providing a frame which has a continuous peripheral side surface defining a cross sectional shape and which is open at each opposite end;
   b. placing a lithium anode in said frame in a manner separating the interior of said frame into two distinct regions each between a surface of said anode and a corresponding open end of said frame the cross sectional shape of said frame conforming with the peripheral shape of said lithium anode;
   c. introducing iodine-containing cathode material into each of said regions and placing a cathode current collector in operative contact with said material in each of said regions;
   d. placing a sheet element against said frame at each end thereof in a manner closing said frame at each end and sealing said sheet elements to said frame; and e. applying a band of iodine impermeable material over said peripheral surface of said frame and onto a portion of each of said sheet elements and sealing said band in place.

12. A method according to claim 11, wherein the peripheral portions of said sheet elements are folded onto the peripheral side surface of said frame and in a manner such that the edges of said sheet elements are in substantially abutting relation.

13. A method according to claim 12, wherein said band is applied over the abutting edges of said sheet elements.

14. A method according to claim 11, further including encapsulating the enclosure in potting material which is non-reactive with iodine.

15. A method according to claim 14, further including the steps of:
 a. placing the encapsulated casing in a hollow casing having an opening at one end; and
 b. closing the hollow casing by placing a lid member over the opening and hermetically sealing the lid member to the casing.

16. A method according to claim 14, wherein said step of encapsulating comprises:
 a. providing a hollow casing including two complementary parts;
 b. introducing liquid potting material to at least one of the casing parts and bringing the parts together and about the enclosure;
 c. placing the casing and liquid potting material within a mold; and
 d. causing said potting material to solidify and removing the mold from the encapsulated casing.

* * * * *